(12) United States Patent
Krebs

(10) Patent No.: US 6,431,708 B2
(45) Date of Patent: Aug. 13, 2002

(54) VISION THERAPY SYSTEM AND METHOD

(75) Inventor: William E. Krebs, Lathrup Village, MI (US)

(73) Assignee: Paul A. Krebs, Clawson, MI (US)

( * ) Notice: Subject to any disclaimer, the term of this patent is extended or adjusted under 35 U.S.C. 154(b) by 0 days.

(21) Appl. No.: 09/745,080

(22) Filed: Dec. 20, 2000

Related U.S. Application Data

(60) Provisional application No. 60/172,901, filed on Dec. 21, 1999, and provisional application No. 60/172,900, filed on Dec. 21, 1999.

(51) Int. Cl.⁷ ................................................ A61B 3/00
(52) U.S. Cl. ................................................... 351/203
(58) Field of Search .......................... 351/200, 202, 351/203

(56) References Cited

U.S. PATENT DOCUMENTS

| 4,522,474 A | * 6/1985 | Slavin ........................ 351/203 |
| 4,779,972 A | 10/1988 | Gottlieb |
| 5,002,383 A | 3/1991 | Sisler |

* cited by examiner

*Primary Examiner*—George Manuel

(57) ABSTRACT

A visual therapy method comprising wearing a series of pairs of yoked prismatic glasses wherein each yoked prism comprises a base and apex opposite the base. The series of pairs comprises: lateral base 0° yoked prisms, lateral base 180° yoked prisms, vertical base 900° yoked prisms, and vertical base 270° yoked prisms. The method includes performing a regimen of ocular exercises while wearing each pair of yoked prismatic glasses. The exercises include versional and vergence exercises. The yoked prismatic glasses are adapted to stimulate inhibitory and initiatory areas, respectively, of the wearer's visual cortex and, thereby improve visual disorders relating to behavioral visual blockage patterns.

17 Claims, 7 Drawing Sheets

VISION THERAPY SYSTEM AND METHOD

RELATED APPLICATIONS

This application claims the benefit of U.S. Provisional Patent Application Ser. No. 60/172,901 entitled "Krebs Autogenous Visual Inhibition Cycle" filed Dec. 21, 1999, and U.S. Provisional Patent Application Ser. No. 60/172,900 entitled "Cortical-Retinal (Sensor-Motor) Projection Fields Chart" filed Dec. 21, 1999.

BACKGROUND OF THE INVENTION

Society places a premium on efficient vision. Academic and occupational environments require increasing amounts of printed and/or visual information to be processed accurately and quickly. The efficiency of a person's visual system influences how the person collects and processes information. Repetitive demands on the visual system tend to create problems in susceptible individuals. Inefficient vision may cause an individual to slow down, be less accurate, experience excessive fatigue, or make errors. When these types of signs and symptoms appear, the individual's conscious attention to the visual process is required. This, in turn, may interfere with the speed, accuracy and comprehension of visual tasks.

Vision is the dominant sense, and is a product of a person's inherited potential, past experiences, and current information. Vision is comprised of three areas of function: visual pathway integrity including eye health, vision acuity, and refracted status; visual skills including accommodation (eye focusing), binocular vision (eye teaming), and eye movements (eye tracking); and visual information processing including identification, discrimination, spatial awareness, and integration with other senses.

Learning to read, and reading for information require efficient visual abilities. The eyes must team precisely, focus clearly and track quickly and accurately across the page. These processes must be coordinated with the perceptual and memory aspects of vision which, in turn, must combine with linguistic processing for comprehension. To provide reliable information, this must occur with precise timing. Inefficient or poorly developed vision requires individuals to divide their attention between the task and the involved visual abilities. Some individuals experience symptoms such as headaches, fatigue, eye strain, errors, loss of place and difficulties sustaining attention. Others may have an absence of symptoms due to the avoidance of visual demanding tasks.

Recent studies have described what happens in the genetic neural structures in the pre-synaptic membrane synaptic vesicles, i.e., the synaptic gap, and the post synaptic membrane chemical structures that cause a blockage of impulses which result in various paroxysmal memory and learning or other behavioral disorders. In the optometry field, at least three behavioral visual blockage patterns have been identified. These cases are typed as B-1 (exophorial), B-2 (esophorial), and C (exophorial constricted). Presently, no mechanisms have been found to open the neuron transmission pathways related to these behavioral blockage patterns.

Thus, there exists a need for a visual therapy system and method to improve the neuron transmission of impulses related to visual processing.

SUMMARY OF THE INVENTION

Accordingly, it is the object of the present invention to provide a visual therapy system and method for improving the neuron transmission of impulses relating to visual processing.

According to the present invention, the foregoing and other objects are obtained by the Autogenous Visual Inhibition Cycle described herein which represents a method for improving the visual efficiency in the versional and vergence ocular motor (eye movement) patterns in order to locate, center, and identify an object in the panoramic views of a patient. The system and method described herein aids to reflect the object data to the information processing systems of explicit (declarative or fact) memory, and also includes implicative (non-declarative or skill) memory patterns as an aid to the psychological process of learning.

The Autogenous Visual Inhibition Cycle described herein includes various regimens of orthoptic binocular vision therapy using various sets of yoked prismatic glasses. The regimen of orthoptic binocular vision therapy corresponds to the various paroxysmal behavioral visual patterns of concern. The visual therapy method includes use of different sets of yoked prismatic glasses in a prescribed sequence wherein each set of yoked prismatic glasses is used to perform various visual therapy exercises.

A visual therapy method is disclosed comprising wearing a series of pairs of yoked prismatic glasses wherein each yoked prism comprises a base and apex opposite the base. The series of pairs comprises:

lateral base 0° yoked prisms, lateral base 180° yoked prisms, vertical base 90° yoked prisms, and vertical base 270° yoked prisms. The method includes performing a regimen of ocular exercises while wearing each pair of yoked prismatic glasses. The exercises include versional and vergence exercises. The yoked prismatic glasses are adapted to stimulate inhibitory and initiatory areas, respectively, of the wearer's visual cortex and, thereby improve visual disorders relating to behavioral visual blockage patterns.

An advantage of the present invention is that it improves the neuron transmission of impulses related to visual processing and thereby reduces the effects of various behavioral visual blockage patterns. The present system and method is also useful in treating stroke victims to improve their visual processing capacity. Other objects and advantages of the invention will become apparent upon reading the following detailed description and appended claims, and upon reference to the accompanying drawings.

BRIEF DESCRIPTION OF THE DRAWINGS

For a more complete understanding of this invention reference should now be made to the embodiments illustrated in the greater detail in the accompanying drawings and described below by way of examples of the invention.

In the drawings.

DETAILED DESCRIPTION OF THE INVENTION

As described above, a person's capacity for visual information processing is strongly related to cultural factors as well as genetic factors. In some cases, such as optometric cases B-1, B-2 and C, the visual disorders are almost entirely related to experience or behavioral patterns. The method described herein known as the Autogenous Visual Inhibition Cycle comprises orthoptic binocular vision therapy using a prescribed sequence of various sets of yoked prismatic glasses. The sequence of the yoked prismatic glasses is used according to the Base Out Plus (BOP) and the Base In Minus (BIM) therapy concepts.

By definition, autogenous inhibition is a reflex relaxation referred to the point of stimulation. It is an initiatory-inhibitory reflex. This reflex is an involuntary, invariable and adaptive response to a given stimulus. It is also a reaction, an invariable and adaptive response to stimulus. As such, it is a reaction, an involuntary movement or exercise of function within the related areas of the visual information processing system of a person.

Figure 1:
FIG. 1 is a perspective view of a lens system as utilized in the method of the present invention.

FIG. 1 shows one embodiment of a yoked prismatic lens system of the present invention being worn by an individual. The lens system is basically a normal pair of spectacles comprising a frame 11 which carries two lenses 12. A prism 14 is mounted within each of the lenses 12. The prisms 14 are "yoked" in that they have the identical orientation of their respective base and apex as described in more detail below with reference to FIGS. 2–10. The purpose of the prisms 14 is to shift a portion of the visual field which lies in the direction of their respective bases and apexes to stimulate a known portion of the wearer's visual cortex.

According to the present invention, a series of yoked prismatic lenses such as those shown in FIG. 1 are used in the vision therapy method described herein. The entire series of yoked prismatic lens pairs comprises eight sets wherein each set contains various dioptric powers, a base-line-apex, and a prescribed base and apex directional axis. The dioptric powers of the yoked prisms is prescribed by a qualified physician according to known methods and would preferably range from 1 to 10 diopters. The sequence of yoked prismatic pairs are particularly suited to addressing accommodative convergence/accommodation (AC/A) ratio behavioral vision patterns. In the optometry profession, these behavioral patterns would include the B-1, B-2 or C case patterns as each case type appears to have a combination of fusional vergence and accommodation vergence anomalies.

Figure 2:
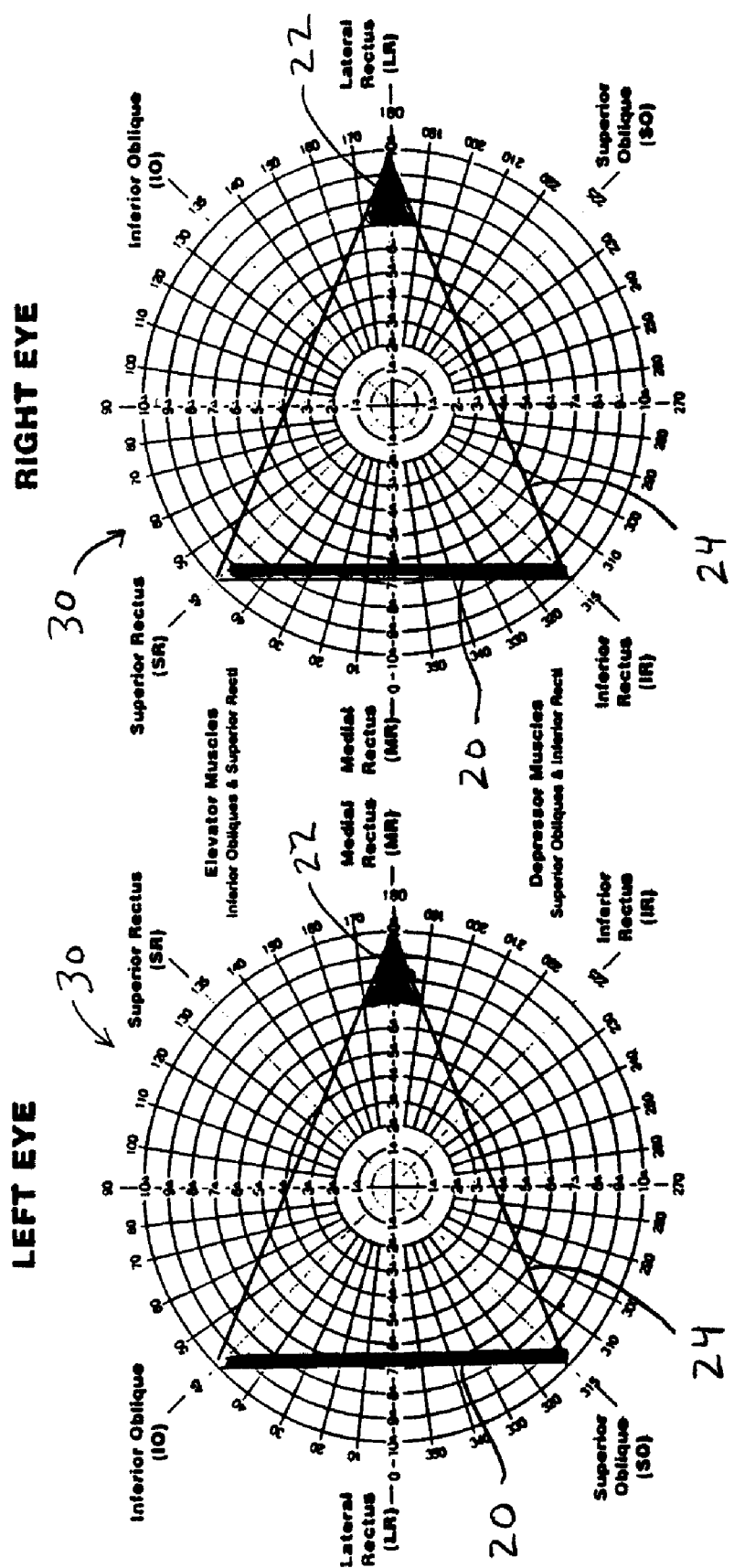
FIG. 2 is a schematic representation of a pair of lateral yoked prisms for use in the method of the present invention.

Referring now to FIG. 2, there is shown a schematic diagram of one pair of yoked prismatic lenses for use with the method of the present invention. The lens arrangement of FIG. 2 is the first in a series of eight yoked prismatic lens pairs. The series of yoked prismatic pairs have positions designated for lateral, vertical and oblique directions. The prismatic pair of FIG. 2 is a lateral yoked prismatic pair having a base 20 left at 0° and an apex 22 at 180° with respect to the horizontal plane.

Each of the prisms 24 is diagramed with respect to a cortical-retinal/sensory-motor projection field 30. The projection field 30 reflects the visual systems neuro and physio-psychological relationships between the eye, retina, retinal projection fields and the opto-motor areas located in each hemispheric occipital visual cortex. The chart is designed to coordinate these neurological principal areas.

Because of the neurological arrangement of the retinal fibers of the retina, and the pathways leading to the occipital cortex, the retinal projection field is conveniently divided into four quadrants. These quadrants include the upper, lower, temporal and nasal fields of vision for each eye and their respective retinal fiber pathways leading to each upper and lower calcarine cortex of each cerebral hemisphere. For accuracy, each of the four retinal quadrants is additionally divided into oblique quadrants. Thus, each eye is described with respect to eight quadrants. Each quadrant is assigned a marked axis in a clockwise fashion on the chart of 0°, 45°, 90°, 135°, 180°, 225°, 270° and 315°.

In addition, the radiating concentric circles and diverging lines serve to delineate the retinal quadrants and include the measures from the central point of fixation to the end points of the chart. These measures are represented in degrees, prism diopters, and their axises in a clockwise radial fashion. The eye muscle labels around the perimeter of the projection field are also positioned according to their corresponding functional purpose in such a way to correspond to the initiatory-inhibitory reflex mechanisms of opto-motor centers. The purpose of this reflex action is for alerting, searching, locating and centering upon the object regarded for identification within the panoramic fields of vision. Thus, the twin charts representing the left and right eyes serve to determine which visual quadrants and which muscle or group of muscles requires additional attention for improving their functional purpose.

Figure 3:
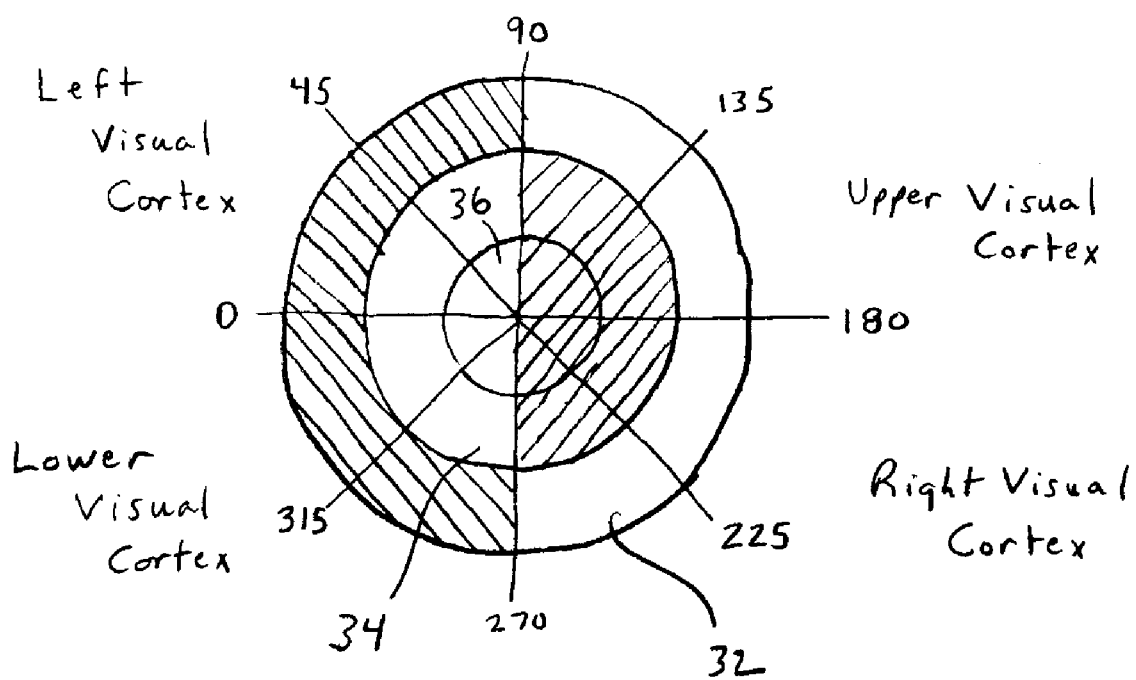
FIG. 3 is a schematic representation of the human visual cortex and the corresponding visual stimulation pattern associated with the yoked prism set of FIG. 2.

Referring now to FIG. 3, there is shown a schematic diagram of the human visual cortex and the projections thereon corresponding to the lateral yoked prismatic pair of FIG. 2. The cortex map is divided into upper, lower, left and right portions.

The yoked prismatic pairs are designed for selecting, separating, and directing radiant energy into two separate simultaneous operational modes within each eye. Such as, for example, each temporal field and each nasal field and their corresponding neural pathways. The apex of the yoked prismatic pair is directed to either the upper, lower, temporal, nasal or oblique quadrants. In some cases, the apex is pointed directly at the particular eye muscle under consideration, while in other cases, the apex is directed between the muscles and its underlying retinal quadrants containing cells or neurons that are to be stimulated to achieve improved visual processing. The apex of the yoked prismatic pair is the initiatory component. It is directed to its selective retinal and corresponding retinal quadrant. It also stimulates the underlying retinal neurons and their pathways leading to the respective and closely integrated neuronal structure areas known as the Brodmann areas. As shown in FIG. 3, the Broadmann areas are as follows: the outer most concentric circle defining the visuo-psychic inhibitory field 32, the middle concentric circle defining the visuo-motor stimulatory field 34 and the inner most concentric circle defining the visuo-sensory stimulatory field 36.

The base of the yoked prismatic pair is the inhibitory or relaxing component. Its base lies in the opposite direction of the stimulated apex retinal quadrants. Therefore, the bases of the prismatic pair have inhibitory actions and are directed toward corresponding retinal neuron pathways leading to the visual cortex areas for inhibitory reflexes in the opposite hemispheric area.

The cortical stimulation map of FIG. 3 corresponds to the lateral yoked prismatic pair of FIG. 2. In this case, the apex portion of the yoked prismatic pair is intended to stimulate the visuo-sensory stimulatory field 36 in the right upper and lower visual cortex, as well as the visuo-motor stimulatory field 34 in the right, upper and lower visual cortex. In contrast, the base of the yoked prismatic pair of FIG. 2 has inhibitory action and is directed towards stimulating the corresponding retinal neural pathways leading to the visual cortex areas for inhibitory reflexes in the opposite hemispheric area. Hence, the base directs radiant energy toward the visuo-psychic inhibitory field 32 of the left, upper and lower visual cortex.

The lateral base 0°, apex 180° prism arrangement of FIG. 2 will stimulate the following extra-ocular muscles: left eye—lateral rectus, inferior oblique, superior oblique; right eye—medial rectus, superior rectus, inferior rectus.

The advantages of this prismatic lens arrangement is that the exact positional axes for each apex and base of the prisms, simultaneously stimulates the corresponding eye muscles in both versional and vergence eye movement activities. It also helps to reduce the blockage that creates most visually related learning disabilities.

The base positional angle of axis of this yoked prismatic pair also simultaneously stimulates the corresponding retinal left visual quadrant fibers and pathways for inhibitory actions in the respective visuo-physic area. These corresponding relationships also act to improve efficiency in the visual information processing systems, by gradually reducing the blockage when using each set of lateral, vertical and oblique yoked prisms. They also automatically elevate the levels of explicit (declarative-fact) and implicit (non-declarative or skill) memories.

A cortical-retinal relationship exists in each occipital visual cortex for each stimulatory and inhibitory response. Thus, as shown in FIG. 3, the right visual cortex areas of visuo-sensory area 36 and visuo-motor area 34 receive only stimulatory impulses. This is shown as the shaded regions on the right half portion of FIG. 3. In contrast, in the opposite hemispheric cortex, only the visuo-psychic area 32 receives the inhibitory reflexes. This is shown as the shaded region on the left-hand portion of FIG. 3.

The remaining yoked prismatic pairs will now be described with reference to FIGS. 4–10. In each case, a simplified schematic is shown which omits the detailed projection field as well as the corresponding cortical stimulation map. Instead, for each case, the corresponding cortical stimulation areas are described.

Figure 4:
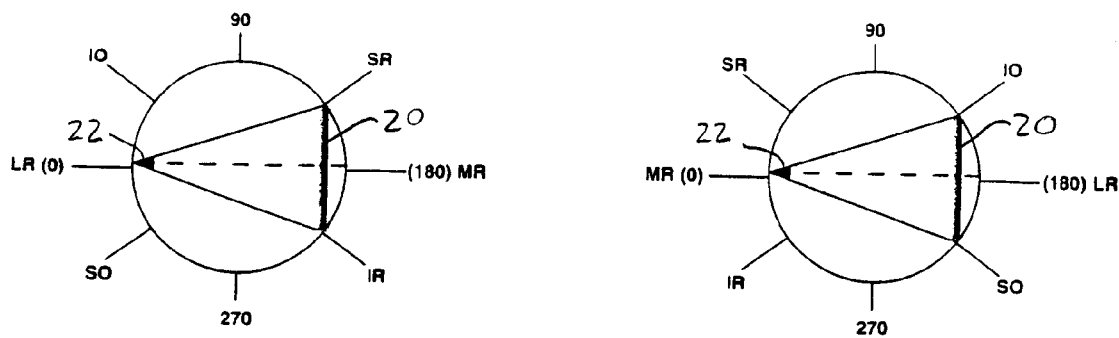
FIG. 4 is a schematic diagram of another pair of lateral yoked prisms for use in the method of the present invention.

Referring now to FIG. 4, there is shown a simplified schematic diagram of a pair of lateral yoked prisms for use in the method of the present invention. In FIGS. 4–10, each prism is represented on a simplified cortical-retinal/sensor-motor projection field chart. In addition, like components have been given the same numbers as the corresponding components identified in FIG. 2. Thus, referring to FIG. 4, the lateral yoked prisms are shown with the bases 20 right at 180°, and the apex 22 left at 0°. FIG. 4 is as follows: From the apex: the left upper and lower visuo-sensory stimulatory field and visuo-motor stimulatory field. From the base: the right upper and lower visuo-psychic inhibitory field.

The lateral base 180°, apex 0° prism arrangement of FIG. 4 stimulates the following extra-ocular muscles: left eye—medial rectus, superior rectus, inferior rectus; right eye—lateral rectus, inferior oblique, superior oblique.

Figure 5:
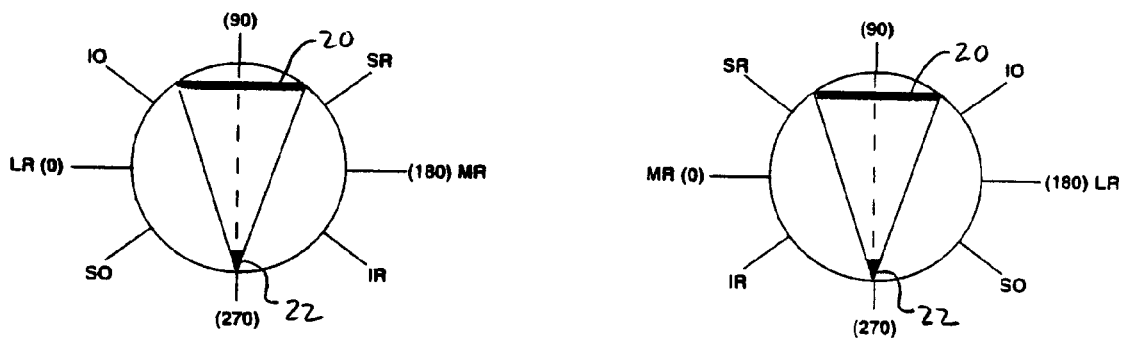
FIG. 5 is a schematic diagram of a pair of vertical yoked prisms for use in the method of the present invention.

Referring now to FIG. 5, there is shown a simplified schematic diagram of a pair of vertical yoked prisms for use in the method of the present invention. This yoked prismatic pair has each respective base 20 up at 90° and each respective apex 22 down at 270°. FIG. 5 is as follows: From the apex: the right and left lower visuo-sensory stimulatory field and visuo-motor stimulatory field. From the base: the left and right upper visuo-psychic inhibitory field.

The vertical base 90°, apex 270° prism arrangement of FIG. 5 stimulates the following extra-ocular muscles: left eye—inferior oblique, superior rectus; right eye—superior rectus, inferior oblique.

Figure 6:
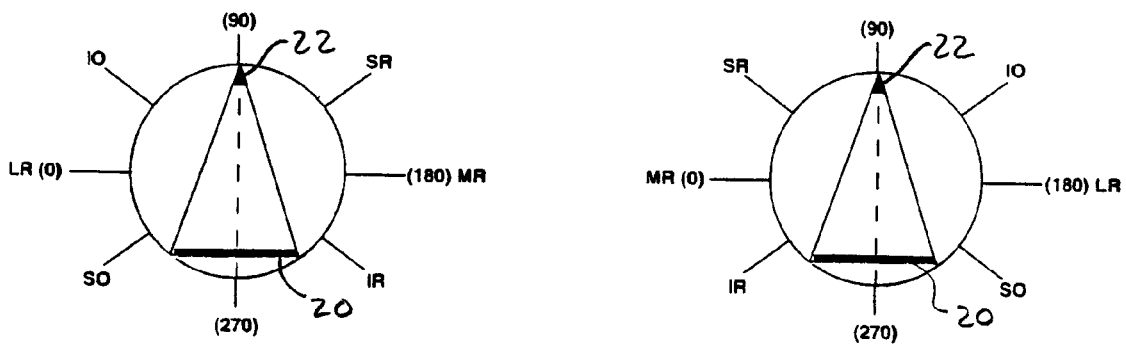
FIG. 6 is a schematic diagram of another pair of vertical yoked prisms for use in the method of the present invention.

Referring now to FIG. 6, there is shown a simplified schematic diagram of a pair of vertical yoked prisms for use in the method of the present invention. The prismatic pair shown in FIG. 6 has each respective base 20 down at 270° and each respective apex 22 up at 90°. The resulting visual cortex stimulation pattern for the yoked prismatic pair of FIG. 6 is as follows. From the apex: the left and right upper visuo-sensory stimulatory fields and visuo-motor stimulatory fields. From the base: the left and right lower visuo-psychic inhibitory field.

The vertical base 270°, apex 90° prism arrangement of FIG. 6 stimulates the following extra-ocular muscles: left eye—superior oblique, inferior rectus; right eye—superior oblique, inferior rectus.

Figure 7:
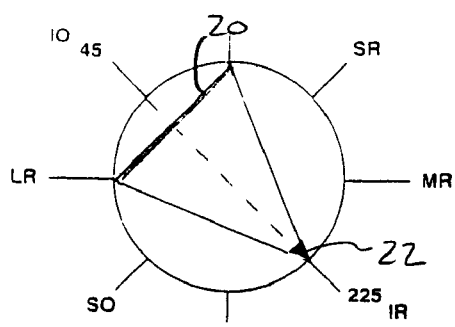
FIG. 7 is a schematic diagram of a pair of oblique yoked prisms for use in the method of the present invention.
Figure 7:
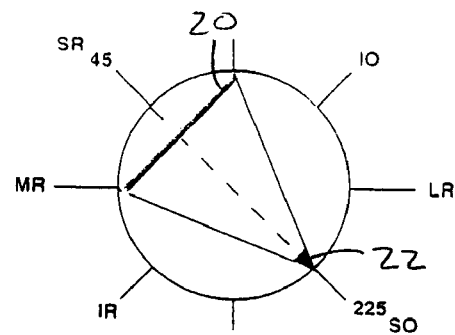

Referring now to FIG. 7, there is shown a simplified schematic diagram of a pair of oblique yoked prisms for use in the method of the present invention. The prismatic pair has each respective base 20 up and to the left at 45°, and each respective apex 22 down and to the right at 225°. The resulting visual cortex stimulation pattern for the prismatic pair of FIG. 7 is as follows. From the apex: the lower right visuo-sensory stimulatory field and visuo-motor stimulatory field. From the base: the upper left visuo-psychic inhibitory field.

The oblique base 45°, apex 225° prism arrangement of FIG. 7 stimulates the following extra-ocular muscles: left eye—lateral rectus, inferior oblique; right eye—medial rectus, superior rectus.

Figure 8:
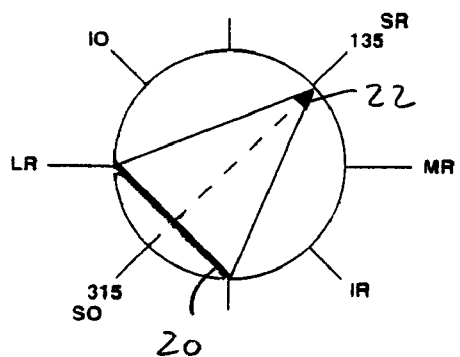
FIG. 8 is a schematic diagram of another pair of oblique yoked prisms for use in the method of the present invention.
Figure 8:
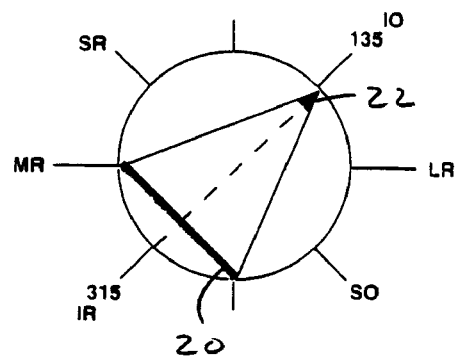

Referring now to FIG. 8, there is shown a simplified schematic diagram of a pair of oblique yoked prisms for use in the method of the present invention. The prismatic pair has each respective base 20 down and to the left at 315°, and each respective apex 22 up and to the right at 135°. The resulting visual cortex stimulation pattern for the prismatic pair of FIG. 8 is as follows. From the apex: the upper right visuo-sensory stimulatory field and visuo-motor stimulatory field. From the base: the lower left visuo-psychic inhibitory field.

The oblique base 315°, apex 135° prism arrangement of FIG. 8 stimulates the following extra-ocular muscles: left eye—lateral rectus, superior oblique; right eye—medial rectus, inferior rectus.

Figure 9:
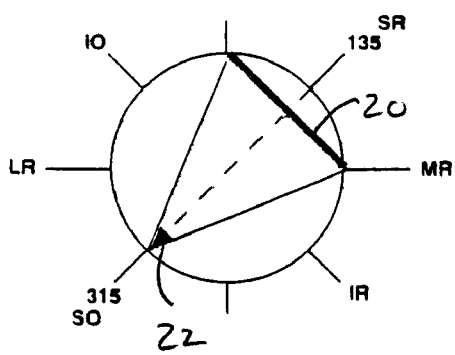
FIG. 9 is a schematic diagram of another pair of oblique yoked prisms for use in the method of the present invention.
Figure 9:
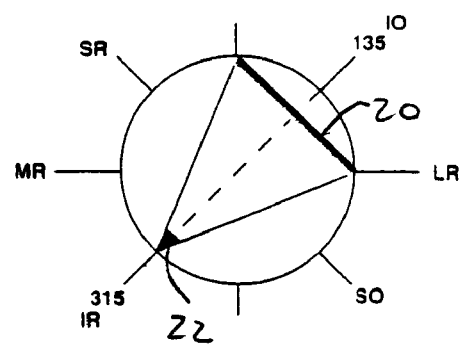

Referring now to FIG. 9, there is shown a simplified schematic diagram of a pair of oblique yoked prisms for use in the method of the present invention. The prismatic pair has each respective base up and to the right at 135°, and each respective apex 22 down and to the left at 315°. The corresponding visual cortex stimulation pattern for the prismatic pair of FIG. 9 is as follows. From the apex: the lower left visuo-sensory stimulatory field and visuo-motor stimulatory field. From the base: the upper right visuo-psychic inhibitory field.

The oblique base 135°, apex 315° prism arrangement of FIG. 9 stimulates the following extra-ocular muscles: left eye—superior rectus, medial rectus; right eye—inferior oblique, lateral rectus.

Figure 10:
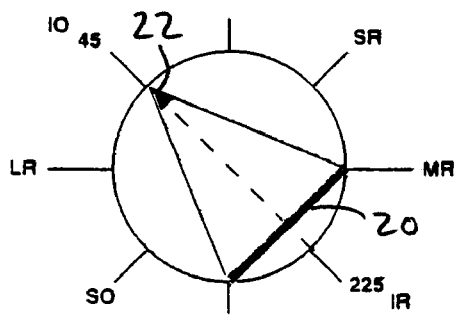
FIG. 10 is a schematic diagram of another pair of oblique yoked prisms for use in the method of the present invention.
Figure 10:
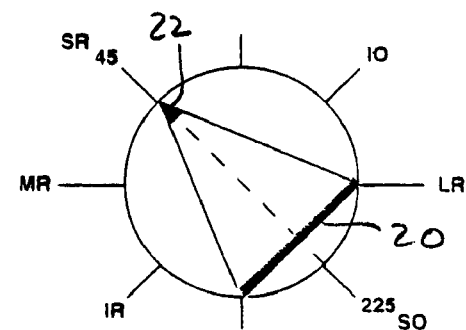

Referring now to FIG. 10, there is shown a simplified schematic diagram of a pair of oblique yoked prisms for use in the method of the present invention. The prismatic pair has each respective base 20 down and to the right at 225°, and each respective apex 22 up and to the left at 45°. The resulting visual cortex stimulation pattern for the prismatic pair of FIG. 10 is as follows. From the apex: the upper left visuo-sensory stimulatory field and visuo-motor stimulatory field. From the base: the lower right visuo-psychic inhibitory field.

The oblique base 225°, apex 45° prism arrangement of FIG. 10 stimulates the following extra-ocular muscles: left eye—inferior rectus, medial rectus; right eye—superior oblique, lateral rectus.

In all of the foregoing yoked prismatic pairs, the base of each respective prism is directed toward an inhibitory or relaxing component. The bases lie in the opposite direction of the stimulated apex retinal quadrants. Therefore, the base of each respective prism has inhibitory actions and is directed toward the retinal neural pathways leading to the visual cortex area for inhibitory reflexes in the visuo-psychic area. In contrast, the apex of each yoked prismatic pair is in the initiatory quadrant. It is directed toward selective retinal quadrants and stimulates the underlying retinal neurons in the pathways leading to the respective visuo-sensory and visuo-motor cortex areas. Hence, a dual relationship exists between each hemispheric and each of the initiatory-inhibitory reflexes for homeostasis. Together, theses areas normally work in a synergistic-antagonistic harmonious and coordinated manner for visual processing. Thus, the Autogenous Visual Inhibition Cycle of the present invention is an autogenous cycle of stimulation and relaxation reflexes upon the retinal quadrants that is directed toward the respective retinal fibers and pathways leading to the visual cortex areas in each hemisphere for the purpose of improving the transmission of visual images along these pathways and hence an individual's visual information processing capacity.

Figure 11:
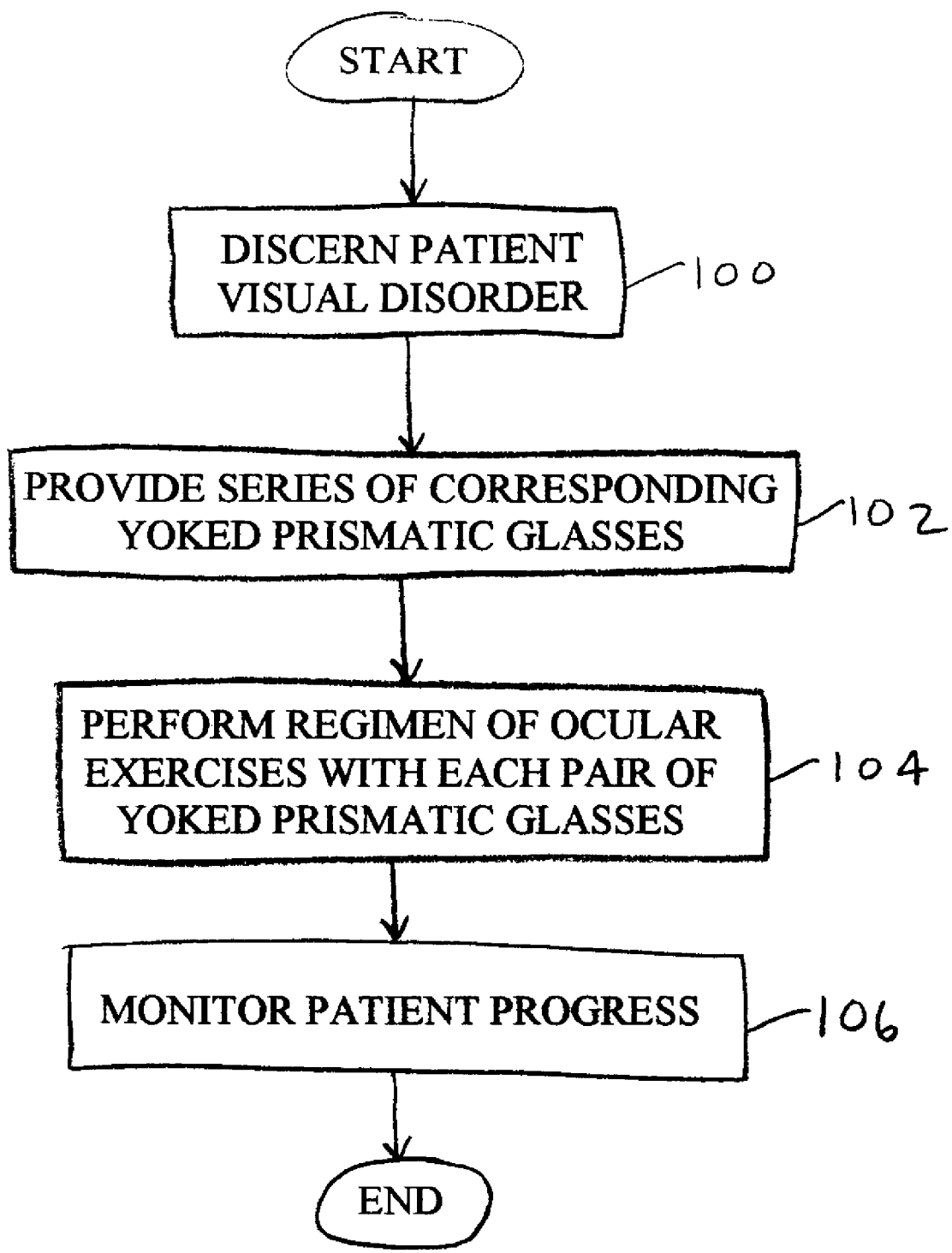
FIG. 11 is a logic flow diagram of one embodiment of a visual therapy method according to the present invention.

Referring now to FIG. 11, there is shown a logic flow diagram of one embodiment of a visual therapy method according to the present invention. The method beg in step 100 by discerning the patient's optrometric case type such as B-1, B-2 or C. A patient's case type can be discerned by known methods as a result of an analytical eye examination by a trained professional as is known in the art. Each of the foregoing case types is related to a combination fusional vergence and accommodation vergence anomalies. Once the patient's case type is known, a series of yoked prismatic pairs selected from the eight groups of prismatic pairs shown in FIGS. 2 and 4–10 are selected for a treatment regimen as shown in step 102. The first yoked prismatic pair (lateral base 0°) corresponds to FIG. 2, the second yoked prismatic pair (lateral base 180°) corresponds to FIG. 4, the third yoked prismatic pair (vertcal base 90°) corresponds to FIG. 5, the fourth yoked prismatic pair (vertical base 270°) corresponds to FIG. 6, the fifth yoked prismatic pair (oblique base 45°) corresponds to FIG. 7, the sixth yoked prismatic pair (oblique base 315°) corresponds to FIG. 8, the seventh prismatic pair (oblique base 135°) corresponds to FIG. 9 and the eighth prismatic pair (oblique base 225°) corresponds to FIG. 10.

Various sequences of the foregoing yoked prismatic pairs are used according to the behavioral visual blockage pattern of the patient. Preferably, to treat a B-1 visual blockage pattern (exophorial cases), the following sequence of yoked prismatic pair glasses are used in a treatment regimen: 1, 2, 3, 4, 7 and 8. Preferably, for a B-2 visual blockage pattern (esophorial cases), the following sequence of yoked prismatic pairs is used in a treatment regimen: 1, 2, 3, 4, 5 and 6. Also preferably for a C visual pattern (exophorial constricted), the following yoked prismatic pair sequence is used for the treatment regimen: 1, 2, 3, 4, 7 and 8. The sequences of yoked prismatic glasses are preferably used according to a Base-Out Plus and Base-In Minus therapy concept.

In step 104, the Autogenous Visual Inhibition Cycle method continues by performing a regimen of ocular exercises with each pair of the yoked prismatic glasses in the prescribed sequence. The exercises performed with each set of yoked prismatic glasses are selected to improve the visual efficiency in the versional and vergence oculomotor patterns in order to locate, center, and identify the object under consideration in the panoramic views of the patient. Versional exercises include exercises to improve the range of ocular movement, ocular saccadic movement and fixation, and ocular pursuit and fixation. An example of a saccadic movement exercise is to have the patient point to the various ceiling corners of a room at the direction of the behavioral optometrist. An example of a pursuit exercise is one that mimics the ocular motion when a person, for example, fixates on a single car of a rotating ferriswheel. Thus, the versional movement exercises are directed towards locating objects. Examples of vergence exercises are those intended to have a patient fuse an image of an object and to focus on an object. One or more versational exercises and vergence exercises are performed with each pair of the yoked prismatic glasses in the prescribed sequence.

Preferably, these exercises would be conducted in a physician's office and include a series of office visits, over time, to stimulate and gradually open the visual behavioral processing patterns. A prescribed retainer set of prismatic glasses would be worn by the patient to continue a regimen of "out of office" ocular exercises to support and further the progress made between each physician office visit.

In step 106, the patient progress is monitored and the ocular exercise regimen modified to improve the visual impairment under consideration. The progress evaluations are used to reinforce certain exercises and/or modify the repetition of certain exercises.

The foregoing visual therapy method is believed to be an effective treatment for many visually related disorders. This Autogenous Visual Inhibition Cycle is coordinated along with the cortical-retinal/sensory-motor projection fields chart. These two systems working together provide the physician with a well directed systematic approach towards a patient's improvement of a visually related disorder. The foregoing method can be used to treat many visual disorders including the following: ocular motility dysfunction, non-estrabismic binocular disorders (inefficient eye teaming), strabismus (misalignment of the eyes), amblyopia (poorly developed vision), accommodative disorders (focusing problems) and visual information processing disorders including visual-motor integration with other sensory modalities. Thus, the foregoing method is a system not only directed toward the visually related dysfunctions, but also simultaneously enhances the visual performance of information processing because the prismatic regimen relates to the neuro-physio-psychological relationships between the visual cortex areas, the retina, the visional projection fields, the controlling oculo-motor nerves, and other visually related areas for visual information processing.

Thus, from the foregoing, it can be seen that there has been brought to the art a new and improved vision therapy system and method. While the invention has been described in connection with one or more embodiments, it should be understood that the invention is not limited to those embodiments. On the contrary, the invention covers all alternatives, modifications, and equivalence, as may be included within the spirit and scope of the appended claims.

What is claimed is:

1. A visual therapy method comprising:
providing a plurality of fixed, yoked prismatic glasses for treating a behavioral visual blockage pattern wherein each yoked prism comprises a base and apex adapted to stimulate inhibitory and initiatory areas, respectively, of a wearer's visual cortex said plurality of glasses including at least one of a lateral, vertical or oblique angled yoked prismatic pair of lenses, said plurality of yoked prismatic glasses forming a set of glasses corresponding to said behavioral visual blockage pattern; and
performing a regimen of ocular exercises while wearing each of the fixed, yoked prismatic glasses within said set.

2. The method of claim 1 wherein one of said plurality of yoked prismatic glasses comprises lateral base 0° yoked prisms.

3. The method of claim 1 wherein one of said plurality of yoked prismatic glasses comprises lateral base 180° yoked prisms.

4. The method of claim 1 wherein one of said plurality of yoked prismatic glasses comprises vertical base 90° yoked prisms.

5. The method of claim 1 wherein one of said plurality of yoked prismatic glasses comprises vertical base 270° yoked prisms.

6. The method of claim 1 wherein one of said plurality of yoked prismatic glasses comprises oblique base 45° yoked prisms.

7. The method of claim 1 wherein one of said plurality of yoked prismatic glasses comprises oblique base 315° yoked prisms.

8. The method of claim 1 wherein one of said plurality of yoked prismatic glasses comprises oblique base 135° yoked prisms.

9. The method of claim 1 wherein one of said plurality of yoked prismatic glasses comprises oblique base 225° yoked prisms.

10. The method of claim 1 wherein the step of performing includes the step of performing a regimen of ocular exercises while wearing each of said yoked prismatic glasses in a predetermined order corresponding to said behavioral visual blockage pattern.

11. The method of claim 1 wherein the step of performing includes performing versional exercises.

12. The method of claim 1 wherein the step of performing includes performing vergence exercises.

13. A visual therapy method comprising:
wearing a series of pairs of fixed, yoked prismatic glasses wherein each yoked prism comprises a base and apex opposite the base, said series of pairs comprising: lateral base 0° yoked prisms, lateral base 180° yoked prisms, vertical base 90° yoked prisms, and vertical base 270° yoked prisms; and
performing a regimen of ocular exercises while wearing each of said fixed, yoked prismatic glasses said regimen including a predetermined sequence of said fixed, yoked prismatic glasses according to a patient behavioral visual blockage pattern.

14. The visual therapy method of claim 13 wherein the series of pairs equals six and comprises: lateral base 0° yoked prisms, lateral base 180° yoked prisms, vertical base 90° yoked prisms, and vertical base 270° yoked prisms, oblique base 45° yoked prisms, and oblique base 315° yoked prisms.

15. The visual therapy method of claim 13 wherein the series of pairs equals six and comprises: lateral base 0° yoked prisms, lateral base 180° yoked prisms, vertical base 90° yoked prisms, and vertical base 270° yoked prisms, oblique base 135° yoked prisms, and oblique base 225° yoked prisms.

16. The visual therapy method of claim 13 wherein the step of performing includes performing versional exercises.

17. The visual therapy method of claim 13 wherein the step of performing includes performing vergence exercises.

* * * * *